US012741737B2

(12) United States Patent
Daandels et al.

(10) Patent No.: US 12,741,737 B2
(45) Date of Patent: Sep. 22, 2026

(54) VORTEX GENERATOR, ASSOCIATED VORTEX GENERATING SYSTEM, AIRCRAFT AND METHOD OF IMPROVING AERODYNAMIC PERFORMANCES

(71) Applicant: Airbus Operations GmbH, Hamburg (DE)

(72) Inventors: Dort Daandels, Hamburg (DE); Alexander Burchard, Hamburg (DE); Michael Grewe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/351,894

(22) Filed: Oct. 7, 2025

(65) Prior Publication Data

US 2026/0097845 A1 Apr. 9, 2026

(30) Foreign Application Priority Data

Oct. 9, 2024 (DE) ..................... 10 2024 129 143.5

(51) Int. Cl.
*B64C 23/06* (2006.01)

(52) U.S. Cl.
CPC .................................... *B64C 23/06* (2013.01)

(58) Field of Classification Search
CPC .......... B64C 23/06; F15D 1/006; F15D 1/007
See application file for complete search history.

(56) References Cited

U.S. PATENT DOCUMENTS 2,690,315 A 9/1954 Todoroff
2,740,596 A * 4/1956 Lee ......................... B64C 23/06 244/130
2,764,373 A 9/1956 Anderson et al.
2,896,880 A * 7/1959 Vogler ...................... B64C 5/08 244/90 R
6,427,948 B1 * 8/2002 Campbell ............... B64C 23/06 244/130

(Continued)

FOREIGN PATENT DOCUMENTS

DE 102005052930 B4 5/2018
KR 102027292 B1 10/2019

(Continued)

OTHER PUBLICATIONS

German Office Action from corresponding German Patent Application No. 102024129143.5 dated Jun. 12, 2025.

*Primary Examiner* — Joshua J Michener
*Assistant Examiner* — Colin Zohoori
(74) *Attorney, Agent, or Firm* — Greer, Burns & Crain, Ltd.

(57) ABSTRACT

A vortex generator for an aircraft. The generator includes a base configured to be connected to an external surface of an aircraft, a baffle being connected to the base and moveable in rotation around a rotation axis relative to the base, and an actuator configured to move the baffle in rotation around the rotation axis relative to the base. The actuator is controllable into at least one active configuration in which the actuator is moving the baffle to a predetermined active position relative to the base and a passive configuration, in which the actuator is allowing rotation of the baffle relative to the base. The baffle is in a feathered position relative to the base when the actuator is in its passive configuration.

16 Claims, 4 Drawing Sheets

(56) References Cited

U.S. PATENT DOCUMENTS

| | | | | |
|---|---|---|---|---|
| 2015/0102156 | A1* | 4/2015 | Devenyi | B64C 23/072 244/13 |
| 2016/0083083 | A1* | 3/2016 | Bordoley | B64C 21/10 244/200.1 |
| 2017/0152025 | A1* | 6/2017 | Stefes | B64C 13/16 |
| 2020/0156761 | A1* | 5/2020 | Tillotson | B64C 3/58 |
| 2020/0369364 | A1* | 11/2020 | Dodt | B64C 9/36 |

FOREIGN PATENT DOCUMENTS

| | | | |
|---|---|---|---|
| KR | 102027293 | B1 | 10/2019 |
| KR | 1020200001222 | A | 1/2020 |
| KR | 1020200015020 | A | 2/2020 |

* cited by examiner

VORTEX GENERATOR, ASSOCIATED VORTEX GENERATING SYSTEM, AIRCRAFT AND METHOD OF IMPROVING AERODYNAMIC PERFORMANCES

CROSS-REFERENCES TO RELATED APPLICATIONS

This application claims the benefit of German Patent Application Number 10 2024 129 143.5 filed on Oct. 9, 2024, the entire disclosure of which is incorporated herein by way of reference.

FIELD OF THE INVENTION

The present disclosure relates to a vortex generator, for example for an aircraft. The present disclosure also relates to a vortex generating system comprising such a vortex generator. This disclosure also relates to an aircraft comprising such a vortex generator and/or vortex generating system and to a method of improving aerodynamic performances using such a vortex generator and/or vortex generating system.

BACKGROUND OF THE INVENTION

Vortex generators are aerodynamic devices configured to generate vortexes, for example to improve the aerodynamic performances of an aircraft. To that end, vortex generators are generally attached to an outer surface of an aircraft, for example upstream of a surface of the aircraft where airflow is likely to separate. Vortex generators are for example installed near leading edges of wings. Vortex generators are then configured to bring turbulence to the airflow in the boundary layer to prevent airflow detachment, for example at the trailing edge of wings. Such devices are critical especially when installed on lifting surfaces, since airflow detachment might lead to stalling of the lifting surface.

Recently, in the domain of vortex generators, and especially of vortex generators for aircrafts, smart vortex generators have been proposed. Such vortex generators generally comprise an actuator which is used to move a baffle of the vortex generator. Such vortex generator aim for example at improving the vortex generation for different flight phases of an aircraft.

Such vortex generators are however not entirely satisfying. Indeed, it is generally difficult to precisely determine which position of the vortex generator is minimizing drag, for example when vortex generation is not required. Furthermore, such vortex generators can be energy expensive since a constant control of the baffle is required to move the baffle in a target position.

SUMMARY OF THE INVENTION

An object of the present invention is thus to provide a vortex generator which is energy efficient and which allows a maximal drag reduction.

To this end, the invention relates to a vortex generator comprising:

- a base, configured to be connected to an external surface of an aircraft,
- a baffle, defining a deflection direction, the baffle being connected to the base and moveable in rotation around a rotation axis relative to the base, and
- an actuator, configured to move the baffle in rotation around the rotation axis relative to the base, the actuator being controllable into:
  - at least one active configuration, in which the actuator is moving the baffle to a predetermined active position relative to the base, and
  - a passive configuration, in which the actuator is allowing rotation of the baffle relative to the base, wherein the baffle is in a feathered position relative to the base when the actuator is in its passive configuration.

The use of an actuator controllable into a passive configuration in which the baffle is in a feathered position is especially advantageous since it allows the vortex generation device to have a configuration in which drag is efficiently reduced without requiring any energy.

According to other advantageous aspects of the invention, the vortex generator comprises one or more of the following features taken alone or according to all technically possible combinations:

- the feathered position corresponds to a position in which the baffle is substantially aligned to an ambient airflow and/or corresponds to minimum drag position of the baffle;
- the base defines a base plane configured to be parallel to the external surface of an aircraft, the rotation axis being substantially perpendicular to the base plane and/or to the deflection direction;
- the baffle is asymmetric relative to the rotation axis;
- the baffle is elongated along the deflection direction, the rotation axis being offset to a center of the baffle taken along the deflection direction;
- in passive configuration, a resistive torque to exceed to rotate the baffle relatively to the base is superior to a predetermined threshold;
- the vortex generator defines a longitudinal direction, configured to correspond to a longitudinal direction of the aircraft, the deflection direction defining with the longitudinal direction a predetermined angle comprised between 5° and 90° when the baffle is in the predetermined active position; and
- the actuator is controllable into a plurality of active configurations, the predetermined active position of the baffle relative to the base being different for each active configuration.

The invention also relates to a vortex generating system comprising a control unit and a vortex generator as above mentioned, wherein the control unit comprises a control module configured to control the actuator into its active and passive configurations.

According to other advantageous aspects of the invention, the vortex generating system comprises one or more of the following features taken alone or according to all technically possible combinations:

- the control module is configured to control an energy supply to the actuator of the vortex generator, the control module being configured to stop the energy supply to the actuator to control the actuator into its passive configuration;
- the control unit comprises an acquisition module, configured to be connected to a gust detection sensor and/or to a flight control computer to acquire a flight configuration information from said gust detection sensor and/or flight control computer, the control module being configured to control the actuator into its active and passive configurations as a function of the acquired flight configuration information;
- the control unit comprises a transmission module, configured to be connected to a display of the aircraft, the transmission module being configured to transmit a baffle information to be displayed, to the display of the aircraft, the baffle information being representative of the position of the baffle relative to the base; and the vortex generating system comprises a plurality of vortex generators, the control module being configured to control the actuators of each vortex generators into their active and/or passive configurations.

The invention also relates to an aircraft comprising a vortex generator as above mentioned and/or a vortex generating system as above mentioned, the base of the or each vortex generator being connected to the external surface of the aircraft.

The invention further relates to a method of improving aerodynamic performances using a vortex generator as above mentioned and/or a vortex generating system as above mentioned, wherein the method comprises the controlling of the actuator into:

at least one active configuration, in which the actuator is moving the baffle to a predetermined active position relative to the base; and/or a passive configuration, in which the actuator is allowing rotation of the baffle relative to the base, wherein the baffle is in a feathered position relative to the base when the actuator is in its passive configuration.

BRIEF DESCRIPTION OF THE DRAWINGS

The invention will be better understood when reading the following description, which is given solely by way of example and with reference to the appended drawings, in which.

DETAILED DESCRIPTION OF THE PREFERRED EMBODIMENTS

Figure 1:
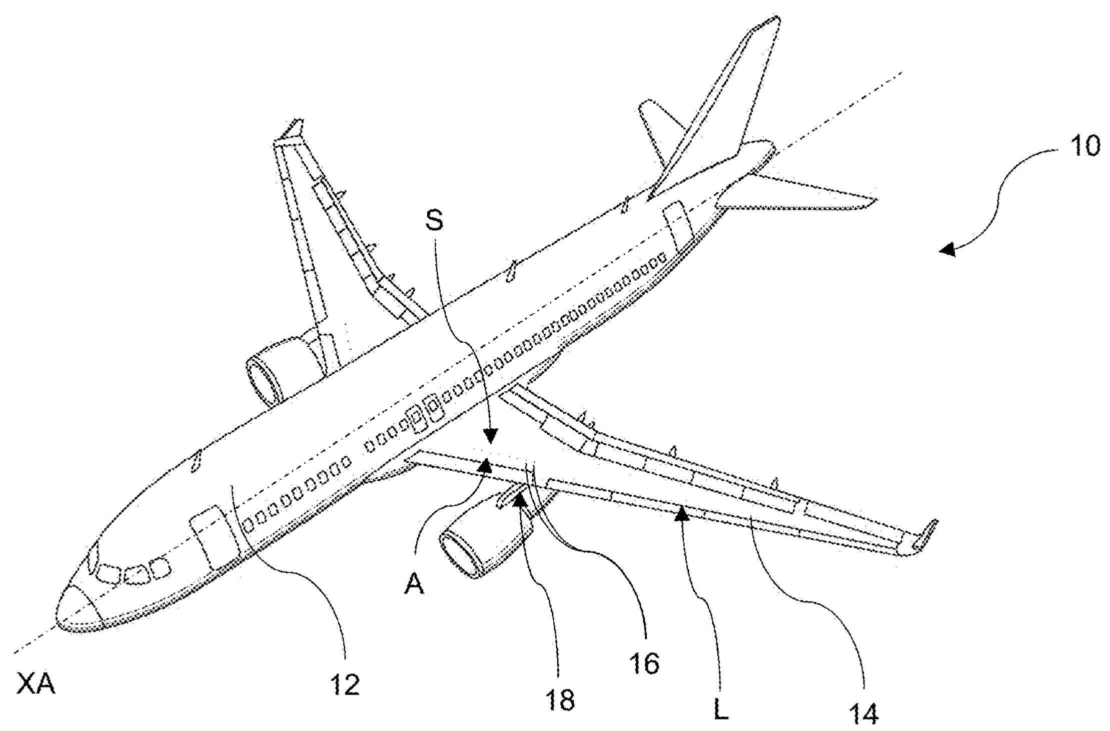
FIG. 1 is a schematic view of an aircraft comprising a vortex generator according to the invention.

With reference to FIG. 1, an aircraft 10 comprises a fuselage 12 and two wings 14.

The aircraft 10 is for example an airplane and for example an airliner.

As illustrated from FIG. 1, the aircraft defines a longitudinal direction XA. The longitudinal direction XA correspond for example to an elongation direction of the fuselage 12 of the aircraft.

The aircraft 10 comprises for example a vortex generator 16 and/or a vortex generating system 18 comprising at least one vortex generator 16.

As this will be presented in more details later in the description, and in some examples, the vortex generating system 18 comprises a plurality of vortex generators 16.

The aircraft 10 further comprises for example comprises a gust detection sensor 19 and/or a flight control computer 21.

Figure 4:
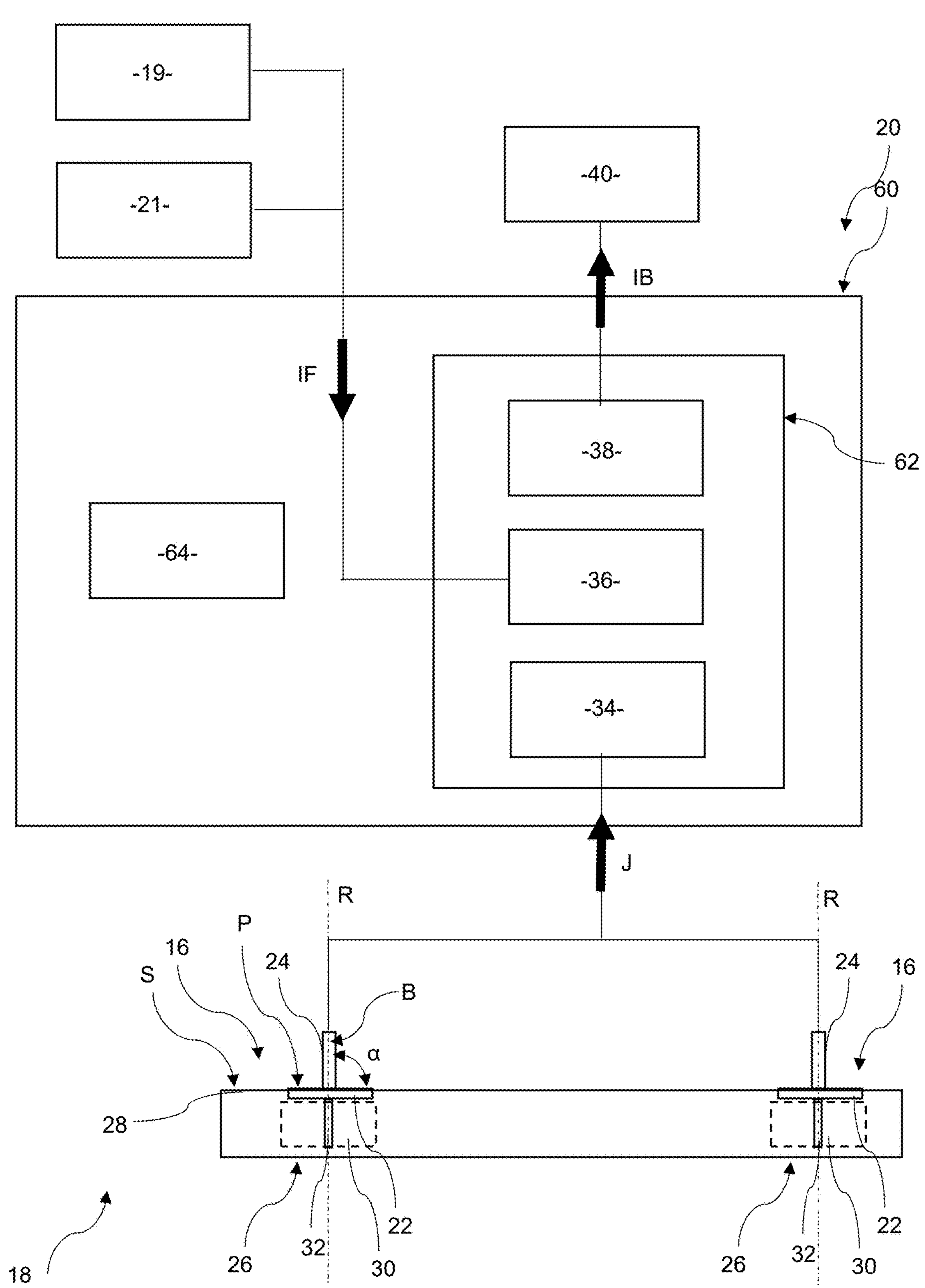

As illustrated on FIG. 4, the vortex generating system 18 further comprises one control unit 20.

The vortex generator 16 comprises a base 22, a baffle 24 and an actuator 26.

The vortex generator 16 defines for example a longitudinal direction XV. The longitudinal direction of the vortex generator XV corresponds for example to the longitudinal direction of the aircraft XA when the vortex generator 16 is arranged on the aircraft 10.

The vortex generator 16 is arranged on an external surface S of the aircraft 10. For example, the vortex generator 16 is arranged on one of the wings 14 of the aircraft 10. As illustrated in FIG. 1, the vortex generator 16 is for example arranged on region A of the wing adjacent to a leading edge portion of the wing L. The vortex generator 16 is for example arranged at an extrados of the wing 14, for example on such a region A of the wing 14.

As illustrated on FIG. 4, the base 22 is for example configured to be connected to the external surface S of the aircraft. The base 22 is fixed relative to the external surface S. For example, as illustrated in FIG. 4, the base 22 is fastened to the external surface S of the aircraft 10, for example glued to the external surface S of the aircraft 10. The base 22 is fore example embedded in, or mounted on, the external surface S of the aircraft 10. In other examples the base 22 is formed by a portion of the external surface S facing the baffle 24.

As visible from FIG. 4, the base 22 defines for example a base plane P. The base plane P is for example, at least locally, substantially (+/−10%) parallel to the external surface of the aircraft 10. For example, and as illustrated in the example of FIG. 4, the base plane P is flush and/or continuous with the external surface S of the aircraft. In examples, the base plane P is recessed relative to the external surface S or protrudes from the external surface S.

In the above-mentioned example in which the base 22 is formed by a portion of the external surface S facing the baffle 24, the base plane P is for example a curved plane, the curvature of such curved plane corresponding to the curvature of the external surface S.

The baffle 24 is connected to the base 22 and is moveable in rotation around a rotation axis R relative to the base 22.

For example, the baffle 24 is substantially flat.

As illustrated from FIG. 4, the baffle extends for example substantially along a baffle plane B. The baffle plane B intersects the base plane P.

For example, the baffle plane B is substantially planar. In other non-illustrated examples, the baffle plane B is a curved plane. Such a curved plane comprises for example a direction along which lines forming the curve plane are parallel to each other.

An angle $\alpha$ between the baffle plane B and the base plane P is for example comprised between 45° and 135°. In the example of FIG. 4, the baffle plane B is substantially planar and is orthogonal to the base plane P.

As illustrated from FIGS. 2A-2C and 3A-3Bb, the baffle 24 defines a deflection direction D.

The deflection direction D of the baffle 24 is for example parallel to the baffle plane B. The deflection direction D is further for example parallel to the base plane P.

The baffle 24 is for example elongated along the deflection direction D.

The deflection direction D is moveable in rotation relative to the base 22 along with the baffle 24.

The baffle 24 is for example configured for interfering with an ambient airflow F depending on the deflection direction D.

For example, the baffle is configured to deflect and/or disrupt the ambient airflow depending on the deflection direction D.

As visible from FIGS. 2A-2C and 3A-3B, the baffle 24 is for example asymmetric relative to the rotation axis R.

Figures 2A, 2B, 2C:
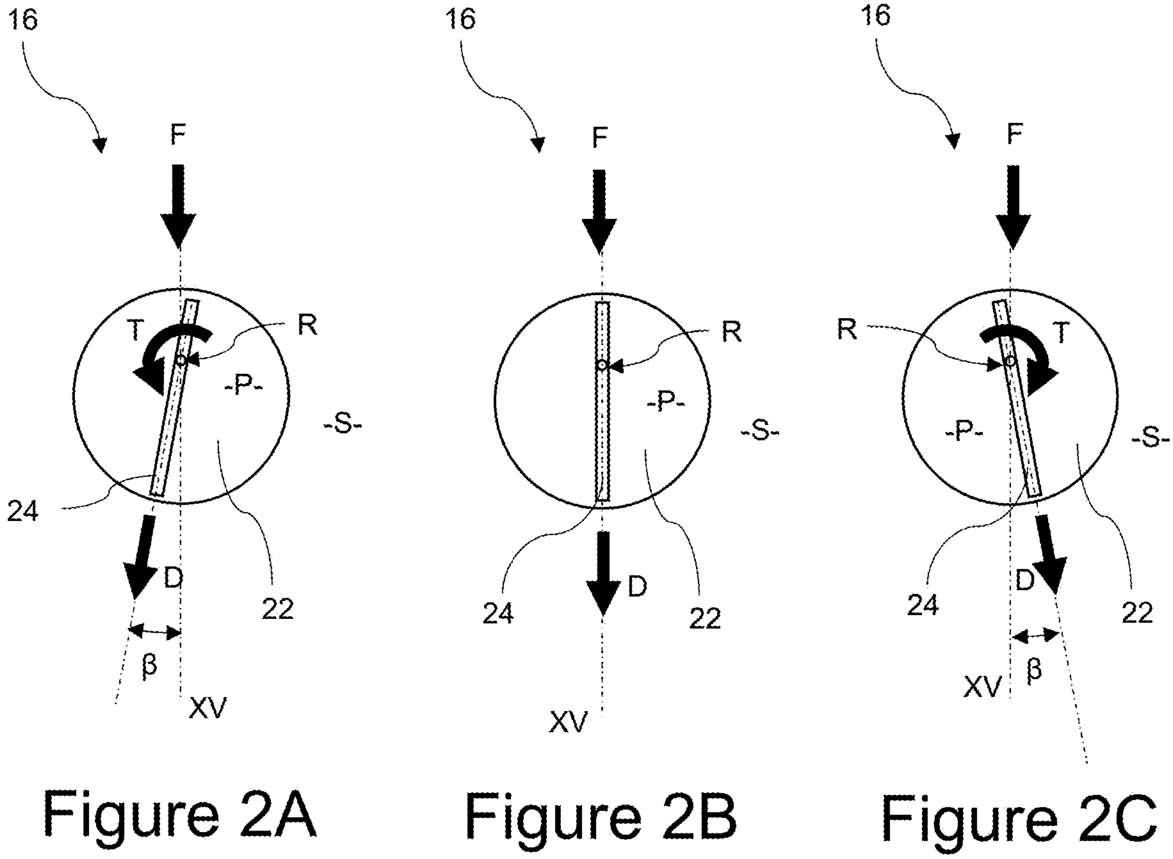
FIG. 2A is a schematic top view illustrations of a vortex generator according to the invention in which the baffle is rotated by an ambient airflow.
FIG. 2B is another schematic top view illustrations of a vortex generator according to the invention in which the baffle is rotated by an ambient airflow.
FIG. 2C is a further schematic top view illustrations of a vortex generator according to the invention in which the baffle is rotated by an ambient airflow.
Figures 3A, 3B:
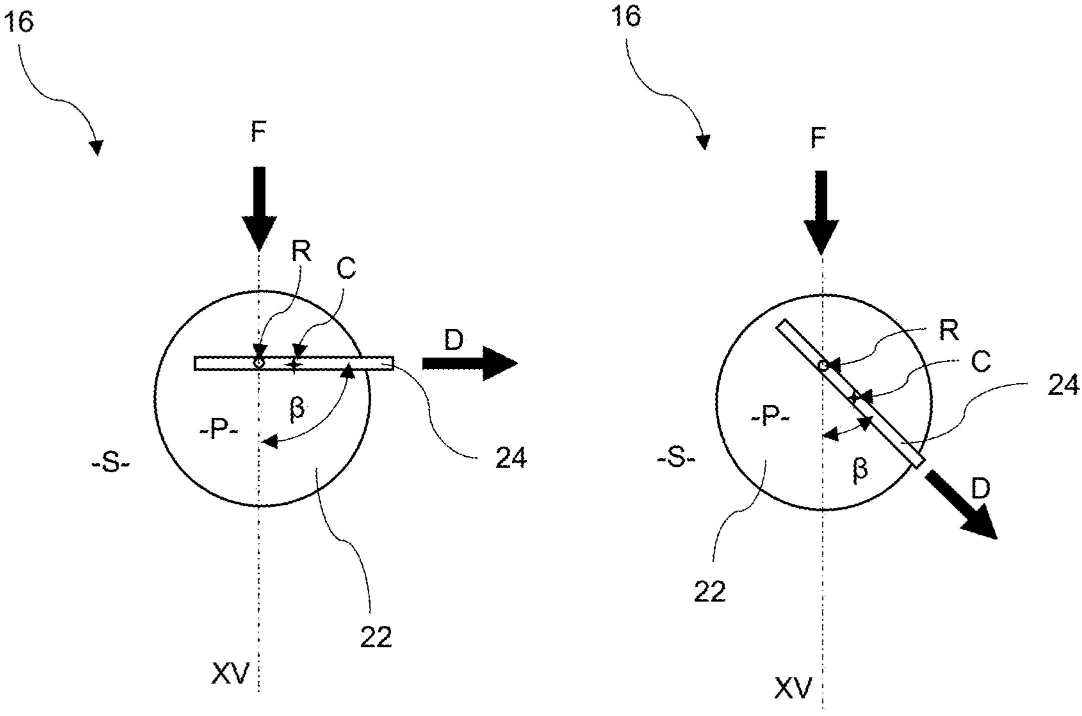
FIG. 3A is a schematic top view illustrations of a vortex generator according to the invention in which the vortex generator is illustrated in a first active position.
FIG. 3B is a schematic top view illustrations of a vortex generator according to the invention in which the vortex generator is illustrated in a second active position, and, FIG. 4 a schematic view of a vortex generating system comprising a plurality of vortex generators.

In the example presented in FIGS. 2A-2C and 3A-3B, the rotation axis R is offset to a center C of the baffle taken along the deflection direction D (the center being only illustrated on FIGS. 3A and 3B for clarity purposes). It is understood that the center C of the baffle, correspond to a middle position of the baffle taken along the deflection direction D. In such an example, asymmetry of the baffle 24 relative to the rotation axis R is at least a result of the position of the rotation axis R relative to the center C of the baffle.

The rotation axis R is for example shifted relative to the center C of the baffle of between 5% to 30% from a total length of the baffle 24 taken along the deflection direction D.

In alternative, or in complement, the shape of the baffle 24, is asymmetric relative to the center of the baffle C.

The actuator 26 is configured to move the baffle 24 in rotation around the rotation axis R relative to the base 22.

As visible from FIGS. 2 to 4, the rotation axis R is for example substantially perpendicular to the base plane P and/or to the deflection direction D.

In the above-mentioned example in which the base plane P is a curved plane, one understands for example from the term "substantially perpendicular to the base plane P" that the rotation axis R is for example substantially perpendicular to a normal plane and/or average plane of the base plane P facing the baffle 24.

The actuator 26 is for example connecting the base 22 to the baffle 24.

The actuator 26 for example comprises a motor 30 and a pin 32. The motor 30 is for example fastened to the base 22 and the pin 32 is for example fastened to the baffle 24. The motor 30 is then for example configured for moving the pin 32 in rotation for moving the baffle 24 in rotation relative to the base 22.

The actuator 26 is controllable into at least one active configuration and one passive configuration. As this will be presented in more details later, the actuator 26 is for example connected to the control unit 20 to be controlled between into its at least one active configuration and one passive configuration.

When the actuator 26 is in its, or one of its, active configuration(s), the actuator is moving the baffle 24 to a predetermined active position relative to the base 22.

When the actuator 26 is in its passive configuration, the actuator 26 is allowing rotation of the baffle 24 relative to the base 22 such that when the actuator 26 is in its passive configuration, the baffle is in a feathered position relative to the base 22.

As this will be understood in more details later, the actuator 26 is for example not supplied in energy when the actuator 26 is in its passive configuration. In other words, the feathered position corresponds for example to a position taken by the baffle 24 when the actuator 26 is not supplied in energy.

Furthermore, and as understood from FIGS. 2A to 2C, the feathered position corresponds for example to a position in which the baffle 24 is substantially aligned to the ambient airflow F and/or corresponds to minimum drag position of the baffle 24.

In particular, when the actuator is in its passive configuration, the ambient airflow F interacts with the baffle 24 so that the baffle 24 is aligned to said airflow F and/or is in its minimum drag position, reaching the feathered position relative to the base 22.

As understood, the feathered position is in particular a position in which the baffle 24 is generating a minimum drag in the ambient airflow, compared to other positions of the baffle 24. The term minimum drag position is then to be understood as substantially minimum drag position, or in other words, a position of the baffle 24 being close to the position of the baffle 24 in which the baffle 24 generates the minimum drag in the ambient airflow F.

In particular, FIG. 2B present the baffle 24 in a feathered position in which the baffle 24 is aligned to the ambient airflow F. As visible from FIGS. 2A and 2C, when the baffle 24 is in a feathered position, and as soon as the deflection direction D deviates from the direction defined by the ambient airflow F, the ambient airflow F applies a torque T on the baffle 24 which brings the deflection direction D back in alignment with the direction defined by the ambient airflow F.

It is then understood that when the baffle 24 is in its feathered position, the ambient airflow interacts with the baffle 24 such that the baffle 24 reaches a position in which it generates a minimum drag.

One further understands that when the aircraft is in symmetrical flying conditions, the deflection direction D of the baffle 24 in its feathered position is for example substantially parallel to the longitudinal direction XV of the vortex generator 16, that is the longitudinal direction XA of the aircraft 10. When the aircraft is in a non-symmetrical flying conditions, for example when the aircraft is skidding or slipping, the deflection direction D of the baffle 24 in its feathered position is for example non-parallel to the longitudinal direction XV of the vortex generator 16, that is non-parallel to the longitudinal direction XA of the aircraft 10.

In other words, an angle β between the deflection direction D and the longitudinal direction XV when the baffle is in its feathered position depends of the ambient airflow and corresponds to an angle in which the baffle 24 is substantially aligned to the ambient airflow F and/or in which the drag generated by the baffle is at its minimum.

In an example, when the actuator 26 is in its passive configuration, the actuator 26 is allowing a torque free rotation of the baffle 24 relative to the base 22.

In another example, when the actuator 26 is in its passive configuration, and although the actuator allows rotation of the baffle relative to the base, a resistive torque is applied between the baffle 24 and the base 22. Such a resistive torque corresponds for example to a torque T to exceed to rotate the baffle 24 relatively to the base 22.

The resistive torque to exceed to rotate the baffle 24 relatively to the base 22 when the actuator 26 is in its passive configuration is for example superior to a predetermined threshold. The predetermined threshold is for example determined at least by friction in the vortex generator 16.

As seen above, when the actuator 26 is in its active configuration, the actuator is moving the baffle 24 to a predetermined active position relative to the base 22. One understands here the term "moving" broadly, such that this term also encompasses the notion of maintaining in position. In other words, when the actuator 26 is in its active configuration, the actuator 26 is moving and/or maintaining the baffle 24 to a predetermined active position relative to the base 22.

In the predetermined active position of the baffle 24, the deflection direction D is defining a predetermined angle β with the longitudinal direction XV of the vortex generator 16.

For example, when the baffle 24 is in the predetermined active position, the absolute value of the predetermined angle β is comprised between 5° and 90°, preferably between 5° and 90°, further preferably between 15° and 90°.

As presented before, and for example, the actuator 26 is controllable between a plurality of active configurations. The predetermined active position of the baffle 24 relative to the base 22 is then for example different for each active configuration of the actuator 26. In other words, the actuator 26 is controllable between a plurality of active configurations such that the baffle 24 defines a plurality of predetermined active positions relative to the base 22.

The baffle 24 is for example illustrated in two distinct active positions relative to the base 22 in FIGS. 3A and 3B.

In FIG. 3A, the actuator 26 is in a first active configuration corresponding to an airbrake configuration. In such an airbrake configuration, the actuator 26 moves the baffle 24 in a predetermined active airbrake position. The predetermined angle β between the deflection direction D and the longitudinal direction XV of the vortex generator 26 is for example comprised between 70° and 90° when the baffle 24 is in its predetermined active airbrake position. In the example of FIG. 3A, the predetermined angle β between the deflection direction D and the longitudinal direction XV of the vortex generator 26 is equal to 90° when the baffle 24 is in its predetermined active airbrake position. In such an airbrake configuration, the baffle 24 disrupt the ambient airflow F such that the ambient airflow F "tumbles" over the baffle 24. This leads to reduced lift and increased drag for the external surface S on which the vortex generator 16 is installed.

In FIG. 3B, the actuator 26 is in a second active configuration corresponding to a vortex generation configuration. In such a vortex generation configuration, the actuator 26 moves the baffle 24 in a predetermined vortex generation position. The predetermined angle β between the deflection direction D and the longitudinal direction XV of the vortex generator 26 is for example comprised between 10° and 70°, and preferably between 10° and 50° when the baffle 24 is in its predetermined active vortex generation position. In the example of FIG. 3B, and for illustration purposes, the predetermined angle β between the deflection direction D and the longitudinal direction XV of the vortex generator 26 is equal to 45° when the baffle 24 is in its predetermined active vortex generation position. In such a vortex generation configuration, the baffle 24 disrupts and deflects the ambient airflow F such that the ambient airflow F "trips" over the baffle 24. In other words, the baffle 24 interacts with the ambient airflow so that the airflow swirls over the baffle 24, resulting in a vortex. This lead to an increased lift for the external surface S on which the vortex generator 16 is installed.

The control unit 20 is for example connected to the or each vortex generator(s) 16 of the vortex generating system 18.

As illustrated from FIG. 4, the control unit 20 comprises a control module 34. The control unit 20 further comprises for example an acquisition module 36 and/or a transmission module 38.

The control module 34 is configured to control the actuator 26 of the vortex generator 16 into its active and passive configurations.

When the vortex generating system 18 comprises a plurality of vortex generators 16, the control module 34 is for example configured to control the actuators 26 of each vortex generators 16 into their active and/or passive configurations. It is understood that in some examples, the control module 34 may control different actuators 26 of the vortex generating system 18 into different configurations.

The control module 34 is for example configured to control an energy supply to the actuator 26 of the vortex generator 16.

The control module 34 is for example configured to stop the energy supply to the actuator to control the actuator 26 into its passive configuration. The baffle 24 is then for example in its feathered position when the control module is stopping the energy supply to the actuator 26.

The control module 34 is for example configured to control the energy supply to the actuator to control the actuator 26 in its active configuration(s). The control module 34 is for example configured to control the electrical power, for example configured to control the voltage and/or current supplied to the actuator 26, so that the actuator 26 is in the or one of its active configuration and so that the baffle 24 reaches the predetermined active position relative to the base 22 corresponding the active configuration of the actuator 26.

The acquisition module 36 is for example configured to be connected to the gust detection sensor 19 and/or to the flight control computer 21 to acquire a flight configuration information IF from said gust detection sensor 19 and/or said flight control computer 21.

The flight configuration information IF is then for example configured to express airflow behavior and/or the aircraft configuration. For example, the flight configuration information IF expresses the probability of occurrence of gusts, for example based on data measured from the gust detection sensors. Additionally, or in alternative, the flight configuration information IF expresses the configuration of the high lift system and/or the windspeed of the aircraft, for example based on data processed by the flight control computer 21.

The control module 34 is for example configured to control the actuator 26 into its active and passive configurations as a function of the acquired flight configuration information IF.

For example, in cruise flight without turbulence, the flight configuration information IF is representative a retracted configuration of the high lift system and of a low gust probability. The control module 34 is then for example configured for controlling the actuator 26 in its passive configuration, as presented in FIG. 2, for example to minimize drag.

For example, in turbulent conditions, the flight configuration information IF is representative of a high gust probability. The control module 34 is then for example configured for controlling the actuator 26 in its active airbrake configuration, as presented in FIG. 3A, for example to alleviate gust loads.

For example, in takeoff or landing configurations, the flight configuration information IF is representative of a deployed configuration of the high lift system. The control module 34 is then for example configured for controlling the actuator 26 in its active vortex generation configuration, as presented in FIG. 3A, for example to prevent airflow detachment for the external surface S.

As visible from FIG. 4, the transmission module 38 is configured to be connected to a display 40 of the aircraft 10.

The transmission module 38 is for example configured to transmit a baffle information IB to be displayed, to the display of the aircraft.

The baffle information IB to be displayed is for example representative of the position of the baffle 24 relative to the base 22.

The baffle information IB is for example evaluated by the transmission module based on data J provided by the actuator 26 and/or provided by a baffle sensor (not represented).

For example, the baffle information IB to be displayed triggers a pilot warning if the baffle is in its feathered position and/or if the baffle is in a position that does not correspond to the predetermined active position controlled by the actuator 26.

In the example of FIG. 4, the control unit 20 is formed as an information processing unit 60 comprising, for example, a memory 62 associated with a processor 64.

In the example of FIG. 4, the control module 34, the acquisition module 36 and the transmission module 38 are each produced in the form of software executable by the processor 64. The memory 62 is then able to store a control software, designed to control the actuator 26 into its active and passive configurations, an acquisition software, designed to acquire a flight configuration information IC from the gust detection sensor 19 and/or from the flight control computer 21 and a transmission software, designed to transmit a baffle information IB to be displayed, to the display 40 of the aircraft.

The processor 64 of the information processing unit 60 is then able to execute the control software, the acquisition software and the transmission software.

In a variant (not shown), the control module 34, the acquisition module 36 and the transmission module 38 are each produced in the form of a programmable logic components, such as a FPGA (Field Programmable Gate Array), or in the form of a dedicated integrated circuit, such as an ASIC (Application Specific Integrated Circuit), or in the form of any combination of ASIC, FPGA and/or software.

In another variant (not shown) the control module 34, the acquisition module 36 and the transmission module 38 are each implemented as analog signal processing devices.

When the control unit 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

A method of improving aerodynamic performances using a vortex generator 16 as described above and/or using a vortex generating system 18 as described above will now be presented.

The method comprises the controlling of the actuator 26 into at least one active configuration, in which the actuator is moving the baffle 24 to a predetermined active position relative to the base 22. In alternative, or in complement, the method comprises the controlling of the actuator 26 into the passive configuration, in which the actuator 26 is allowing rotation of the baffle 24 relative to the base 22.

As presented above, the baffle 24 is in a feathered position relative to the base 22 when the actuator 26 is in its passive configuration.

The method comprises for example the successive controlling of the actuator into distinct active configurations and passive configuration, by the control module 34 depending on the flight control IF information acquired by the acquisition module 36.

As presented above, having a baffle 24 in a feathered position when the actuator 26 is in a passive configuration is especially advantageous for reducing drag and reducing energy requirements of vortex generators.

Having rotation axis R being substantially perpendicular to the base plane P and/or to the deflection direction D is especially advantageous to efficiently actuate the baffle 24.

The use of an asymmetric baffle 24, and for example of a baffle in which the rotation axis R is offset to a center of the baffle 24 is especially advantageous to simply ensure that the baffle 24 is in a feathered position when the actuator 26 is in its passive configuration.

A resistive torque to exceed to rotate the baffle 24 relatively to the base 22 being superior to a predetermined threshold is especially advantageous to prevent undesired oscillations of the baffle 24 around its feathered position.

The predetermined angle between the deflection direction D and the longitudinal direction XV comprised between 5° and 90° when the baffle 24 is in the predetermined active position is particularly relevant to ensure an aerodynamic effect of the vortex generator 16.

Having an actuator 26 controllable into a plurality of active configurations, and having active positions of the baffle 24 relative to the base 22 being different for each active configurations is especially relevant to adapt the behavior of the vortex generator 16 as required from the flight configurations of the aircraft 10.

The use of a control module 34 being configured to stop the energy supply to the actuator 26 to control the actuator 26 into its passive configuration is especially relevant to simply and economically control the actuator 26 into its passive configuration.

The use of an acquisition module 36 configured to acquire a flight configuration information IF from a gust detection sensor 19 and/or flight control computer 21 and having a control module 34 being configured to control the actuator 26 into its active and passive configurations as a function of the acquired flight configuration information IF is especially relevant to improve the flight behavior of the aircraft 10.

The use of a transmission module 38 configured to be connected to a display 40 of the aircraft 10 and configured to transmit a baffle information IB to be displayed, to the display of the aircraft 10 ensures improved situational awareness for the crew of the aircraft 10 and thus improves safety of operation of the aircraft 10.

A control module 34 being configured to control the actuators 26 of a plurality vortex generators 16 into their active and/or passive configurations is especially relevant to have an effective yet economical vortex generation system 18.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vortex generator comprising:

a base configured to be connected to an external surface of an aircraft, a baffle defining a deflection direction, the baffle connected to the base and configured to move in rotation around a rotation axis relative to the base, and an actuator configured to move the baffle in rotation around the rotation axis relative to the base, the actuator being a motor and controllable into:

at least one active configuration in which the actuator is configured to rotate the baffle to a predetermined active position relative to the base, and a passive configuration in which the actuator allows rotation of the baffle relative to the base, wherein the baffle is in a feathered position relative to the base when the actuator is in the passive configuration.

2. The vortex generator according to claim 1, wherein the feathered position corresponds to a position in which the baffle is substantially aligned to an ambient airflow, or corresponds to a minimum drag position of the baffle, or both.

3. The vortex generator according to claim 1, wherein the base defines a base plane configured to be parallel to the external surface of the aircraft, the rotation axis being substantially perpendicular to the base plane, or to the deflection direction, or to both.

4. The vortex generator according to claim 1, wherein the baffle is asymmetric relative to the rotation axis.

5. The vortex generator according to claim 4, wherein the baffle is elongated along the deflection direction, and wherein the rotation axis is offset to a center of the baffle taken along the deflection direction.

6. The vortex generator according to claim 1, wherein, in the passive configuration, a resistive torque which must be exceeded in order for the baffle to rotate relative to the base is greater than a predetermined threshold.

7. The vortex generator according to claim 1, wherein the vortex generator defines a longitudinal direction configured to correspond to a longitudinal direction of the aircraft, the deflection direction defining with the longitudinal direction a predetermined angle ($\beta$) between 5° and 90° when the baffle is in the predetermined active position.

8. The vortex generator according to claim 1, wherein the actuator is controllable into a plurality of active configurations, the predetermined active position of the baffle relative to the base being different for the plurality of active configurations.

9. A vortex generating system comprising:

a control unit; and the vortex generator according to claim 1, wherein the control unit comprises a control module configured to control the actuator into the at least one active configuration and the passive configuration.

10. The vortex generating system according to claim 9, wherein the control module is further configured to control an energy supply to the actuator of the vortex generator and configured to stop the energy supply to the actuator to control the actuator into the passive configuration.

11. The vortex generating system according to claim 10, wherein the control unit comprises an acquisition module configured to be connected to a gust detection sensor, to a flight control computer, or both to acquire a flight configuration information, and wherein the control module is further configured to control the actuator into the at least one active configuration and the passive configuration as a function of the flight configuration information.

12. The vortex generating system according to claim 9, wherein the control unit comprises a transmission module configured to be connected to a display of the aircraft and configured to transmit, to the display of the aircraft, a baffle information to be displayed, the baffle information representative of a position of the baffle relative to the base.

13. The vortex generating system according to claim 9, wherein the vortex generating system comprises a plurality of vortex generators, the control module being configured to control actuators of the plurality of vortex generators into at least one active configuration and the passive configuration, respectively.

14. An aircraft comprising:

the vortex generator according to claim 1, the base of the vortex generator connected to the external surface of the aircraft.

15. An aircraft comprising:

the vortex generating system according to claim 9, the base of the vortex generator connected to the external surface of the aircraft.

16. A method of improving aerodynamic performances with the vortex generator according to claim 1, the method comprising:

controlling of the actuator into:

the at least one active configuration, in which the actuator is moving the baffle to the predetermined active position relative to the base; or the passive configuration in which the actuator allows rotation of the baffle relative to the base; or both, wherein the baffle is in a feathered position relative to the base when the actuator is in the passive configuration.

* * * * *